(12) United States Patent
Buthmann et al.

(10) Patent No.: US 12,142,986 B2
(45) Date of Patent: Nov. 12, 2024

(54) SPLIT CAN

(71) Applicant: KSB SE & Co. KGaA, Frankenthal (DE)

(72) Inventors: Lukas Buthmann, Frankenthal (DE); Juergen Groeschel, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 397 days.

(21) Appl. No.: 17/594,445

(22) PCT Filed: Apr. 9, 2020

(86) PCT No.: PCT/EP2020/060184
§ 371 (c)(1),
(2) Date: Oct. 15, 2021

(87) PCT Pub. No.: WO2020/212250
PCT Pub. Date: Oct. 22, 2020

(65) Prior Publication Data
US 2022/0190702 A1 Jun. 16, 2022

(30) Foreign Application Priority Data
Apr. 17, 2019 (DE) ............ 10 2019 002 797.3

(51) Int. Cl.
*H02K 49/10* (2006.01)
*F04D 17/08* (2006.01)
*F04D 29/044* (2006.01)

(52) U.S. Cl.
CPC .......... *H02K 49/106* (2013.01); *F04D 17/08* (2013.01); *F04D 29/044* (2013.01)

(58) Field of Classification Search
CPC ...... F04D 13/025; F04D 17/08; F04D 29/044; H02K 49/106; H02K 5/128; Y02P 10/25
See application file for complete search history.

(56) References Cited

U.S. PATENT DOCUMENTS

| 4,998,863 A | * | 3/1991 | Klaus | ............ F04D 13/025 |
| | | | | 417/63 |
| 2015/0198052 A1 | | 7/2015 | Pavlov et al. | |

(Continued)

FOREIGN PATENT DOCUMENTS

| CN | 103726049 A | 4/2014 |
| CN | 104775116 A | 7/2015 |

(Continued)

OTHER PUBLICATIONS

EP-2843808-A2, Hudec, all pages, Canned motor with pressure resistant can (Year: 2015).*

(Continued)

*Primary Examiner* — Naishadh N Desai
(74) *Attorney, Agent, or Firm* — Crowell & Moring LLP

(57) ABSTRACT

A split can for a magnetic coupling includes a cylindrical jacket region and a base region connected to a first end of the jacket region. The jacket region has an inner wall and an outer wall enclosing the inner wall. The inner wall and the outer wall are spaced apart from each other in the radial direction by a gap, with the inner wall being integrally joined to the outer wall by a plurality of webs. The gap may be provided with a control medium which may be monitored to detect changes in one or more characteristics of the control medium indicative of split can leakage.

16 Claims, 4 Drawing Sheets

(56) References Cited

U.S. PATENT DOCUMENTS

| | | | | |
|---|---|---|---|---|
| 2015/0206637 A1* | 7/2015 | Schneider | ........... | F04D 13/0626 |
| | | | | 335/288 |
| 2016/0084256 A1* | 3/2016 | Drechsel | ............. | F04D 13/0626 |
| | | | | 417/420 |
| 2017/0072587 A1* | 3/2017 | La Forest | ................ | B22F 10/18 |

FOREIGN PATENT DOCUMENTS

| | | |
|---|---|---|
| CN | 106807944 A | 6/2017 |
| DE | 36 39 719 A1 | 6/1988 |
| DE | 39 31 665 C1 | 2/1991 |
| DE | 20 2012 006 480 U1 | 9/2012 |
| DE | 10 2012 017 321 A1 | 3/2014 |
| EP | 0 286 822 A2 | 10/1988 |
| EP | 1 777 414 A1 | 4/2007 |
| EP | 2843808 A2 * | 3/2015 ............. H02K 5/128 |
| EP | 2 904 269 B1 | 11/2018 |
| WO | WO 2014/032816 A1 | 3/2014 |

OTHER PUBLICATIONS

International Search Report (PCT/ISA/210) issued in PCT Application No. PCT/EP2020/060184 dated Jun. 24, 2020 with English translation (five (5) pages).

German-language Written Opinion (PCT/ISA/237) issued in PCT Application No. PCT/EP2020/060184 dated Jun. 24, 2020 (eight (8) pages).

German-language Office Action issued in German Application No. 10 2019 002 797.3 dated Feb. 18, 2020 (five (5) pages).

Chinese-language Office Action issued in Chinese Application No. 202080029278.5 dated Jan. 15, 2024 with English translation (15 pages).

* cited by examiner

SPLIT CAN

BACKGROUND AND SUMMARY OF THE INVENTION

The present invention relates to a split can for a magnetic clutch having a cylindrical covering region and a base region which adjoins a first end of the covering region, wherein at least the covering region and, if necessary, the base region has/have an inner wall and an outer wall which surrounds the inner wall, wherein the inner wall and the outer wall are spaced apart from each other by means of a gap in a radial direction and in the base region in an axial direction. The base region is preferably arranged in a shell-like manner and adjoins the covering region at the first end.

Magnetic clutches serve to transmit power, for example, to centrifugal pumps, and comprise a primary component which is rigidly connected to the motor shaft and a secondary component which is arranged together with an impeller on a shaft. The primary component and secondary component are provided with permanent magnets. In each case, the opposite poles which attract each other as a result of the magnetic force path are opposite each other. If the primary component is driven, the secondary component also runs synchronously.

By using a split can between the primary component and secondary component, a sealing is achieved between these components so that, for example, fluids or gases from the secondary side cannot travel in the direction toward the primary side. This is significant particularly when the magnetic clutch is used, for example, in a pump. In this instance, the impeller of the pump is arranged together with the secondary component of the magnetic clutch on a common shaft whilst the primary component is connected to a motor shaft. Depending on the conveying medium of the pump, it must then be prevented from reaching the primary component or the motor via the split can.

As a result of faults or malfunctions, it is, on the one hand, possible for the primary component and/or the secondary component to directly damage the split can, on the other hand, the split can may become damaged directly by magnetic or non-magnetic solid materials of the conveying medium. However, this damage can be detected during current operation only with difficulty. For this reason, double-walled split cans have been found to be advantageous in practice, wherein there is arranged between the walls a gap which is continuously monitored by monitoring sensors and consequently it is possible to detect damage to the split can.

As a result of the double-walled configuration, two protective coverings which are independent of each other are further provided so that, even when the inner protective covering is damaged, the magnetic clutch can readily operate.

Such double-walled split cans are known, for example, from EP 1 777 414 A1, EP 2 904 269 B1 or DE 20 2012 006 480 U1.

In order to produce such split cans, two split cans which are produced separately are generally arranged one inside the other and connected to each other. Sheet metal or ceramic material is generally used as the material. Ceramic material is advantageous in this regard since the material itself cannot be magnetized, whereby the eddy current losses can be reduced. However, such split cans are comparatively expensive to produce.

A split can produced in this manner is, however, not only disadvantageous with regard to the production costs, but generally also has a relatively large wall thickness. The term wall thickness in this context is intended to be understood to refer to the smallest spacing from the inner face of the inner wall to the outer face of the outer wall. The larger this wall thickness is, the greater the material also is between the primary component and secondary component.

This leads, on the one hand, to greater transmission losses and, on the other hand, with split cans of sheet metal, to eddy current losses between the primary component and secondary component.

During the operation of the magnetic pump with a metal split can, particularly the eddy current losses lead to heat development and consequently to heating of the split can. As a result of the gap, the inner wall and the outer wall are at least partially separated from each other thermally so that both walls become heated to a different extent and thermally expand. In order to counteract this, a thermal paste or the like is generally arranged in the gap. However, this is very complex, particularly since it has to be ensured that the relatively viscous thermal paste reaches each region of the gap.

Based on this, an object of the invention is to provide a split can which is characterized in comparison with the previously known split cans by an improved torque transmission and an improved thermal behavior.

This object is achieved by a split can according to claim 1, wherein the inner wall is integrally connected to the outer wall by means of a plurality of webs. Consequently, at least the covering region, but preferably the entire split can is formed integrally or in one piece. This is possible in particular by using additive production methods, such as, for example, the powder bed method.

In the powder bed method, in the first step, a layer of a powder is applied in each case and in the second step solidified using binding agents or also the application of energy. In this instance, the binding agent or the energy is supplied to the powder bed only at the locations where the split can is intended to be produced in the respective layer. Afterwards, the construction platform is lowered by a layer thickness and the next powder layer is applied. The excess powder has to be removed at the end of the production process. As a result of such a method, it is possible to form filigree but at the same time stable split cans. Compared with the previously known split cans, significantly smaller wall thicknesses are possible.

As a result of the webs, on the one hand, sufficient stability is achieved between the inner wall and the outer wall, via which, for example, pressure impacts can be well absorbed or damped and via which, on the other hand, a thermal compensation between the inner wall and the outer wall is achieved. It is thereby possible for the inner wall and the outer wall to become heated or to thermally expand in a comparatively homogeneous manner.

However, it is not only within the context of the invention for the covering region to be constructed with double walls. The base region, in a similar manner to the covering region, may also be constructed with double walls.

In a preferred embodiment of the invention, the webs are arranged in a peripheral direction between the inner wall and outer wall and extend in a longitudinal direction. In this context, the longitudinal direction is intended to be understood to refer to the direction which is orientated parallel with the covering region. The number and the spacing of the webs is the result of mechanical and thermal optimization with the objective of keeping the eddy current losses as low as possible. Thus, the webs may, for example, have a width in the peripheral direction of from 0.3 to 5 mm and be arranged with any spacing in the peripheral direction of preferably from 1 to 3 mm.

Alternatively, the webs may also be arranged in the longitudinal direction between the inner wall and the outer wall and extend in the peripheral direction. In this instance, the webs have an annular configuration with a width in the longitudinal direction of from 0.3 to 5 mm, wherein the spacing which is between the webs can be freely selected and it is preferably between 1 and 4 mm.

However, the invention also makes provision for other alternative embodiments of the webs and structures, so it is possible, for example, also a helical configuration, the curved and a penetration of channels which are arranged in the longitudinal and peripheral direction. Furthermore, the individual alternatives may also be combined with each other. By using, on the one hand, webs which extend in the longitudinal direction and, on the other hand, webs which extend in a peripheral direction, a grid-like arrangement of webs is achieved in the gap.

According to a development of the invention, there are provided in the outer wall one or more openings which are connected to the gap. Via these openings, several objectives can be achieved at the same time. On the one hand, during the production excess powder may be discharged from the gap. On the other hand, via this opening, after the production a gaseous or fluid medium can be introduced into the gap. This may, for example, be cooling or heating fluids. In the embodiment of the webs, it should then be ensured that the corresponding medium can expand over the entire gap. In the case of webs which extend in the longitudinal direction, for example, there may be provided in the gap an annular region which adjoins the openings and which is free from webs. The medium can thereby expand first in the peripheral direction and subsequently from there in the longitudinal direction. Preferably, two collection channels are provided in this instance.

If the channels extend in the peripheral direction, for example, there may be provided in the webs interruptions through which the medium can pass. Thus, in the case of a plurality of webs which are arranged one behind the other, the gaseous or fluid medium can also reach each region of the gap.

Regardless of the specific configuration of the webs, the openings are preferably arranged at the second end of the covering region. Preferably, two openings which are arranged opposite each other are provided.

In a preferred embodiment, the medium is a control medium which is arranged within the gap. There are then provided on the split can, for example, in the openings, one or more monitoring sensors which are constructed in such a manner that they detect damage to the outer wall on the basis of a change of a characteristic value of the control medium. This characteristic value may, for example, be the dew point, the oxygen content, the pressure or the conductivity of the control medium.

If the dew point is monitored, the monitoring sensor is a dew point sensor, which continuously monitors the dew point of a fluid control medium. If the can becomes damaged, a conveying medium may, for example, reach the gap and mix with the control medium. This leads to a displacement of the dew point.

Alternatively, the gap is filled with a gaseous control medium, for example, argon or another noble gas, wherein the monitoring sensor is an oxygen sensor. If, for example, external air is introduced into the gap, the oxygen content changes and the sensor outputs an error message. The same applies when the monitoring sensor is constructed as a conductivity sensor.

Regardless of the selection of the monitoring sensor, the control medium is preferably a non-reactive fluid. It is possible to use, for example, transformer oil as a fluid control medium.

As already explained above, the split can according to the invention may be constructed in a comparatively filigree and thin-walled manner. The outer wall thus has a thickness of preferably from 0.5 to 2 mm, the inner wall has a thickness of preferably from 1 mm to 3 mm and the gap has a thickness of preferably from 1 mm to 3 mm. Consequently, the wall thickness of the split can is in the range from 2.5 to 8 mm.

Preferably, there are provided in the base region a plurality of ribs which are arranged in a star-like manner in particular in a radial direction. These ribs serve to stabilize the base region and to stabilize the split can during the production.

The invention also relates to a magnetic clutch, wherein the split can according to the invention is arranged between a primary component and a secondary component which are provided with permanent magnets in each case.

The invention further also relates to a method for producing the split can according to the invention, wherein the split can is formed integrally by means of an additive material application, for example, by means of a powder bed method.

The invention is explained in detail below with reference to an embodiment.

DETAILED DESCRIPTION

Figure 1:
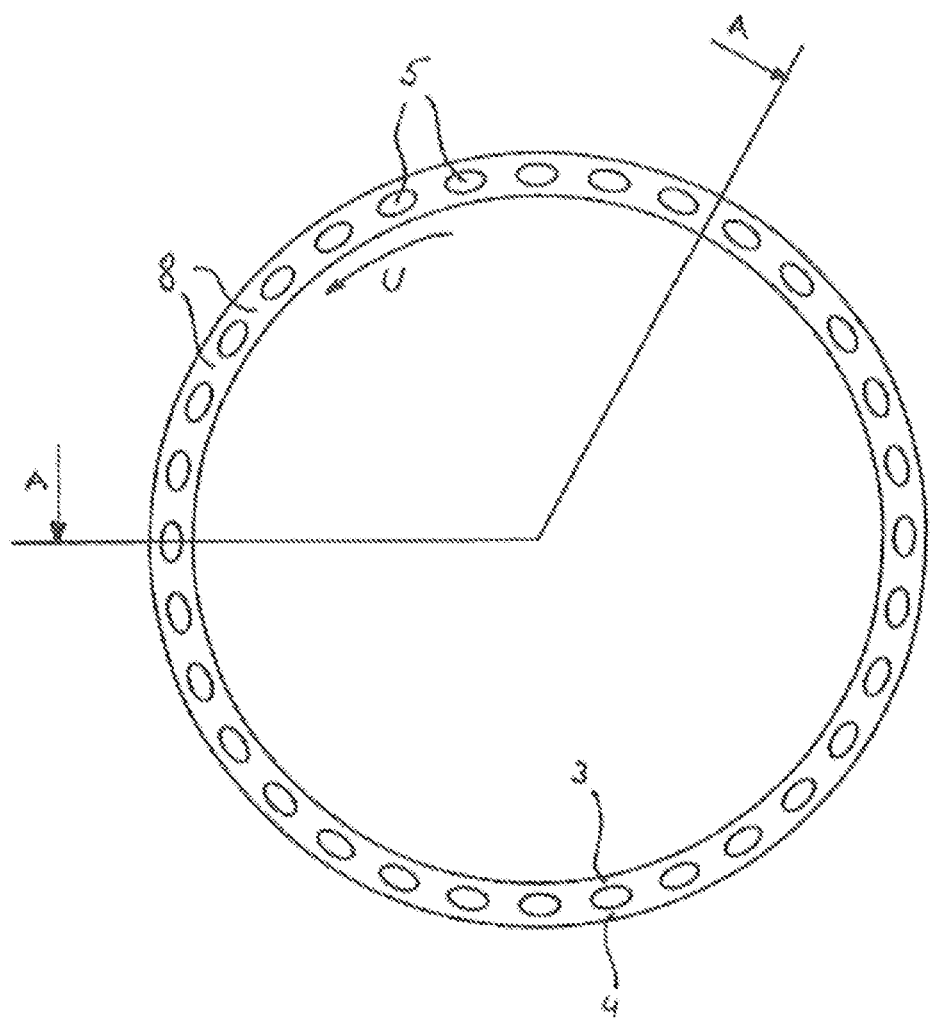
FIG. 1 shows a split can according to an embodiment of the invention with webs which extend in the longitudinal direction as a cross section in a radial direction.
Figure 2:
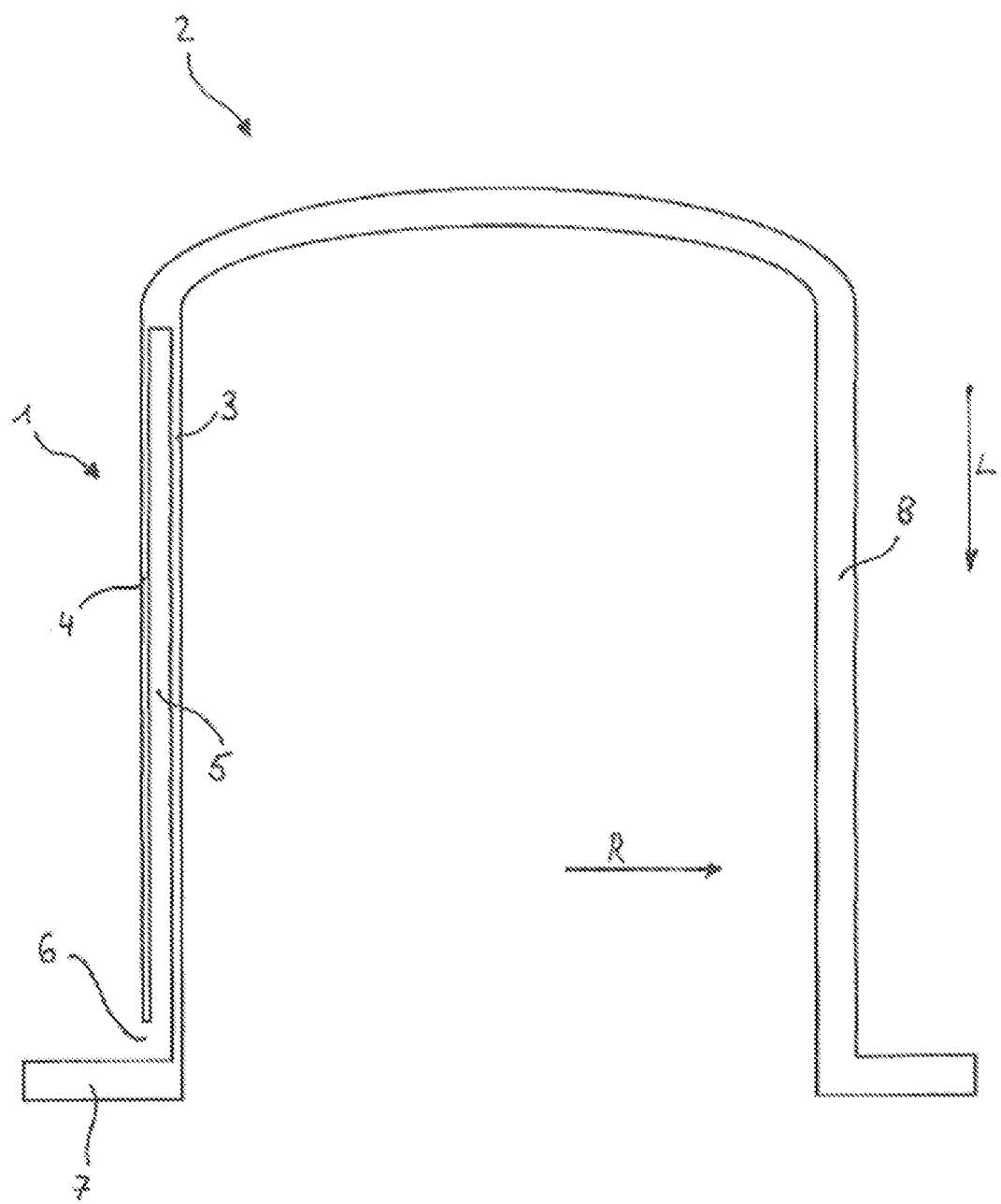
FIG. 2 shows a split can according to FIG. 1 as a cross section A-A.

FIGS. 1 and 2 show in a simplified illustration an embodiment of the split can according to the invention having webs (8) which extend in the longitudinal direction (L). The covering region (1) is configured with double walls and has an inner wall (3) and an outer wall (4), which are spaced apart from each other in a radial direction (R). The webs (8) are arranged between the inner wall and outer wall (3, 4) and constructed integrally with the inner wall and the outer wall (3, 4).

At a first end of the covering region (1), the split can is closed by means of a shell-like base region (2). The base region (2), in the example shown, does not have a double-walled configuration but instead ribs which are not illustrated and via which the base region (2) is reinforced. However, it is within the scope of the invention for the base region to be constructed in a double-walled manner.

On the whole, in the peripheral direction (U) 32 webs (8) are provided, wherein the number is not limited to this. The webs (8) are in this instance configured in such a manner that the gap (5) between the webs (8) is sub-divided into elliptical channel portions. These channel portions may, for example, be filled with a gaseous or a fluid control medium.

To this end, in the outer wall (4) at a second end of the split can there is provided an opening (6) via which the control medium can be introduced. The gap (5) or the channel portions extend along the entire covering region (1). The split can may also be configured in such a manner that a heating or cooling capability is possible.

At the second end of the split can there is further arranged a flange (7) via which the split can be secured in a magnetic clutch. The flange (7) is also illustrated only in simplified form and generally has apertures for receiving securing means, for example, screws.

Figure 3:
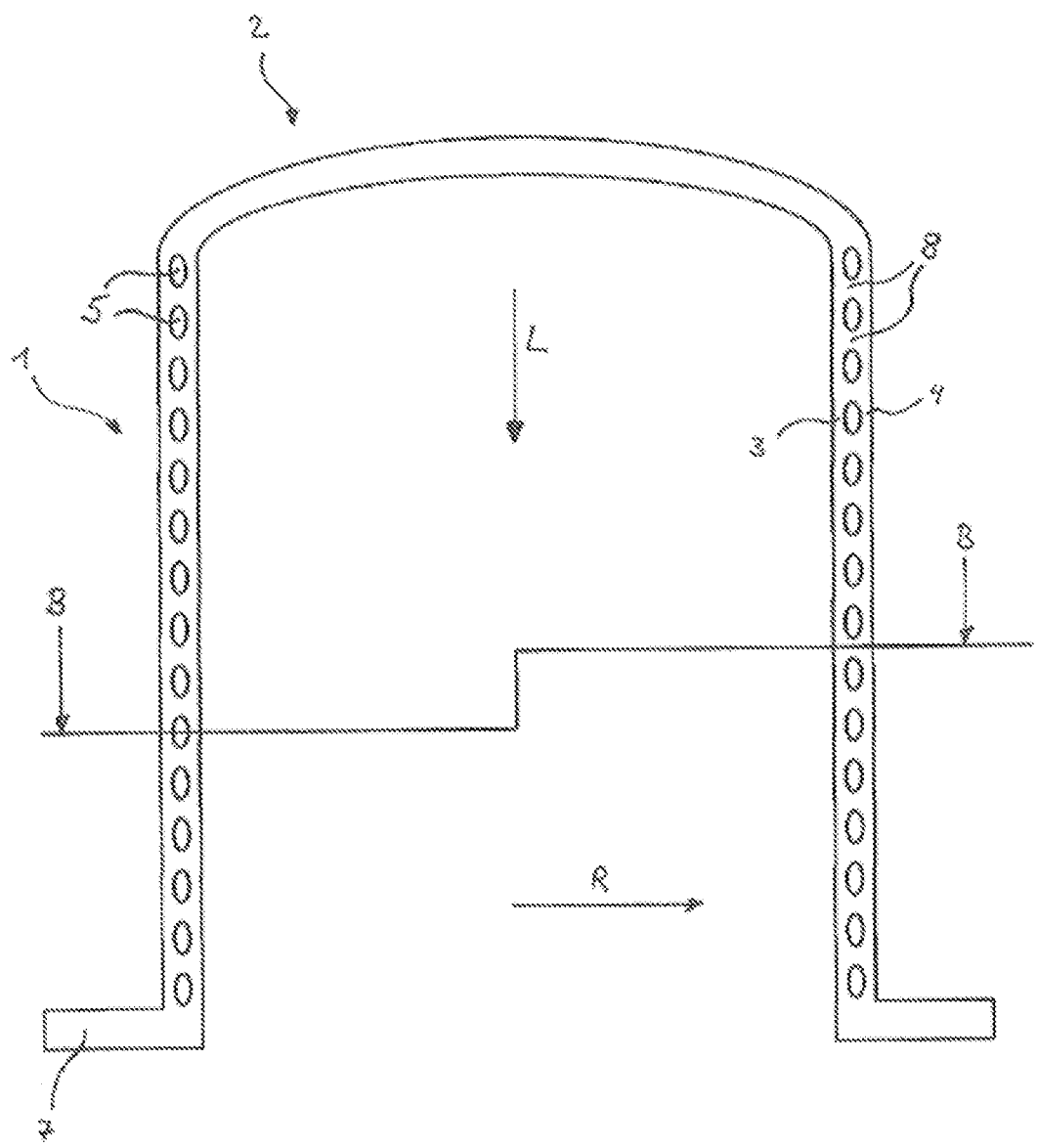
FIG. 3 shows a split can according to another embodiment of the invention with webs which extend in a peripheral direction as a cross section in the longitudinal direction.
Figure 4:
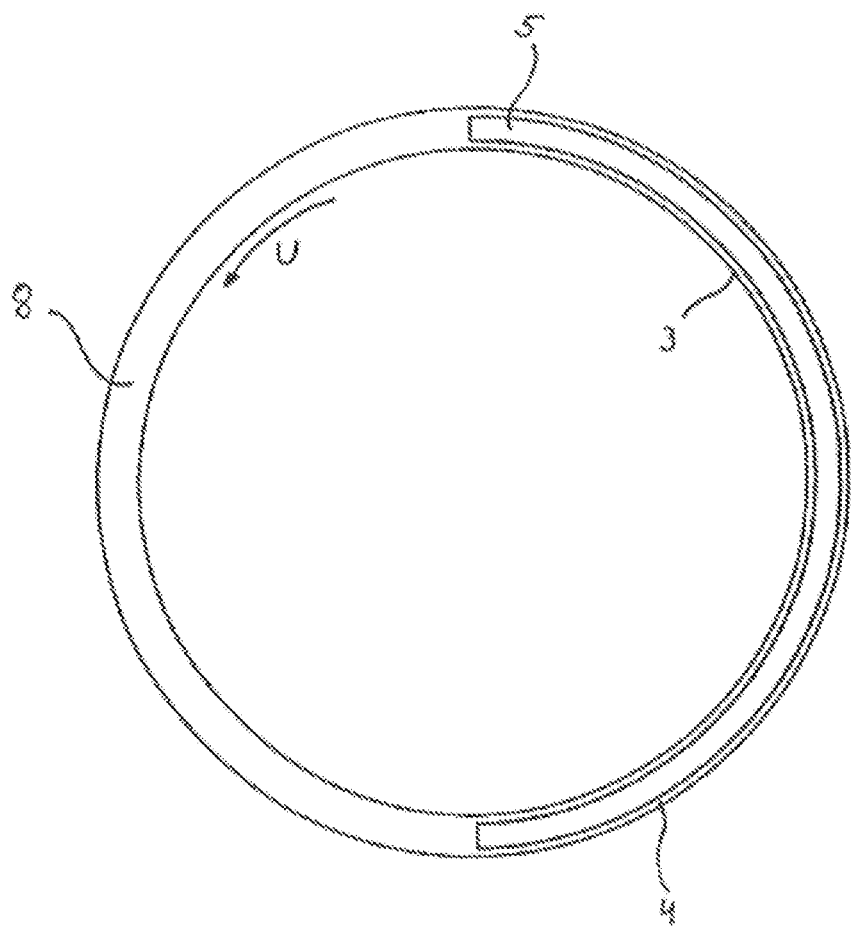
FIG. 4 shows a split can according to FIG. 3 as a cross section B-B.

FIGS. 3 and 4 show an alternative embodiment of the split can according to the invention in which the webs (8) extend between the inner wall (3) and the outer wall (4) in a peripheral direction (U) and are arranged in the longitudinal direction (L) one above the other in the covering region (1). In this instance, there are also formed in the gap (5) elliptical channel portions which are arranged between the individual webs (8). The shell-like base region (2) is also free from webs (8) here.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A split can for a magnetic clutch, comprising:
   cylindrical integral covering region;
   a base region adjoining a first end of the cylindrical integral covering region, wherein
     at least the cylindrical integral covering region has an inner wall and an outer wall surrounding the inner wall,
     the inner wall and the outer wall are radially spaced apart from each other by gap; and
   a plurality of webs are integrally formed with the inner wall and the outer wall.

2. The split can as claimed in claim 1, wherein
   the webs are arranged as connections between the inner wall and outer wall in a peripheral direction and extend in a longitudinal direction, or
   the webs are arranged as connections between the inner wall and outer wall in the longitudinal direction and extend in the peripheral direction.

3. The split can as claimed in claim 2, wherein
   the webs are arranged as connections between the inner wall and outer wall intersecting each other in the longitudinal direction and in the peripheral direction and decoupling an inlet and an outlet of the gap via a guiding device.

4. The split can as claimed in claim 3, wherein
   the webs decline in the direction of flanges and are arranged between the inner wall and the outer wall and extend in a peripheral direction.

5. The split can as claimed in claim 1, wherein
   the split can includes a plurality of layers and webs as a homogeneous component.

6. The split can as claimed in claim 1, wherein
   the inner wall is integrally connected to the outer wall by a plurality of multi-dimensional connections and is a homogeneous component.

7. The split can as claimed in claim 1, wherein
   the covering region is formed by an additive method.

8. The split can as claimed in claim 1, wherein
   the base region includes ribs.

9. The split can as claimed in claim 1, wherein
   one or more openings are provided in the outer wall.

10. The split can as claimed in claim 9, wherein
    the one or more openings are two opposing openings.

11. The split can as claimed in claim 9, wherein
    a control medium is arranged within the gap,
    a monitoring sensor is configured to monitor a characteristic value of the control medium to sense a change of a characteristic value of the control medium indicative of damage to one or both of the inner wall and the outer wall.

12. The split can as claimed in claim 11, wherein
    the characteristic value is a dew point, an oxygen content, an internal pressure or a conductivity of the control medium.

13. The split can as claimed in claim 1, wherein
    the gap has a width of from 0.5 mm to 3 mm.

14. The split can as claimed in claim 1, wherein
    the split can has a wall thickness of from 0.5 to 8 mm.

15. A magnetic clutch, comprising:
    a primary component provided with permanent magnets;
    a secondary component provided with permanent magnets; and
    a split can arranged between a primary component and secondary component, the split can having
      a cylindrical integral covering region;
      a base region adjoining a first end of the cylindrical integral covering region,
      wherein at least the cylindrical integral covering region has an inner wall and an outer wall surrounding the inner wall,
      the inner wall and the outer wall are radially spaced apart from each other by gap, and
      a plurality of webs are integrally formed with the inner wall and the outer wall.

16. A method for producing a split can comprising the steps of:
    forming the split can integrally by an additive material application, the split can having
      a cylindrical integral covering region;
      a base region adjoining a first end of the cylindrical integral covering region,
      wherein at least the cylindrical integral covering region has an inner wall and an outer wall surrounding the inner wall,
      the inner wall and the outer wall are radially spaced apart from each other by gap, and
      a plurality of webs are integrally formed with the inner wall and the outer wall.

* * * * *